United States Patent
Kumar et al.

(10) Patent No.: US 9,130,872 B2
(45) Date of Patent: Sep. 8, 2015

(54) WORKLOAD BASED SERVICE CHAIN INSERTION IN A NETWORK ENVIRONMENT

(71) Applicant: CISCO TECHNOLOGY, INC., San Jose, CA (US)

(72) Inventors: Surendra M. Kumar, San Ramon, CA (US); Nagaraj Bagepalli, Fremont, CA (US); Abhijit Patra, Saratoga, CA (US); Paul Quinn, San Francisco, CA (US); Ethan M. Spiegel, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 362 days.

(21) Appl. No.: 13/843,233

(22) Filed: Mar. 15, 2013

(65) Prior Publication Data

US 2014/0280836 A1  Sep. 18, 2014

(51) Int. Cl.
*G06F 15/173* (2006.01)
*G06F 15/16* (2006.01)
*H04L 12/24* (2006.01)
*H04L 12/931* (2013.01)
*H04L 12/933* (2013.01)

(52) U.S. Cl.
CPC ............ *H04L 41/5041* (2013.01); *H04L 49/15* (2013.01); *H04L 49/70* (2013.01)

(58) Field of Classification Search
CPC ...... H04L 41/5041; H04L 49/70; H04L 49/15
USPC .......................................... 709/242, 239, 228
See application file for complete search history.

(56) References Cited

U.S. PATENT DOCUMENTS

| | | | |
|---|---|---|---|
| 6,888,828 B1 | 5/2005 | Partanen et al. | |
| 7,095,715 B2 | 8/2006 | Buckman et al. | |
| 7,443,796 B1 | 10/2008 | Albert et al. | |
| 7,486,622 B2 | 2/2009 | Regan et al. | |
| 8,018,938 B1 * | 9/2011 | Fromm et al. | 370/392 |
| 8,195,774 B2 * | 6/2012 | Lambeth et al. | 709/220 |
| 8,730,980 B2 | 5/2014 | Bagepalli et al. | |
| 9,001,827 B2 * | 4/2015 | Appenzeller | 370/392 |
| 2002/0156893 A1 | 10/2002 | Pouyoul et al. | |
| 2002/0167935 A1 | 11/2002 | Nabkel et al. | |
| 2003/0110081 A1 | 6/2003 | Tosaki | |
| 2003/0226142 A1 | 12/2003 | Rand | |
| 2005/0044197 A1 | 2/2005 | Lai | |
| 2006/0045024 A1 | 3/2006 | Previdi et al. | |
| 2006/0074502 A1 | 4/2006 | McFarland | |
| 2006/0112400 A1 | 5/2006 | Zhang et al. | |
| 2007/0061441 A1 | 3/2007 | Landis et al. | |
| 2007/0067435 A1 | 3/2007 | Landis et al. | |

(Continued)

*Primary Examiner* — Hieu Hoang
(74) *Attorney, Agent, or Firm* — Patent Capital Group

(57) ABSTRACT

An example method for workload based service chain insertion in a network environment is provided and includes partitioning a service-path into fragments at a service controller, where the service-path comprises an ordered sequence of services to be provided to a packet associated with a workload in a network. The method also includes determining a location of service nodes providing the services; and provisioning the fragments at interfaces at a distributed virtual switch. The method could further include generating a plurality of service insertion points corresponding to the fragments at a service dispatcher. The service dispatcher can include a plurality of data plane components, and the service insertion points are generated at the data plane components.

20 Claims, 12 Drawing Sheets

(56) References Cited

U.S. PATENT DOCUMENTS

| | | |
|---|---|---|
| 2008/0080509 A1 | 4/2008 | Khanna et al. |
| 2008/0080517 A1 | 4/2008 | Roy et al. |
| 2008/0177896 A1 | 7/2008 | Quinn et al. |
| 2008/0291910 A1* | 11/2008 | Tadimeti et al. .............. 370/389 |
| 2010/0054260 A1 | 3/2010 | Pandey et al. |
| 2010/0214949 A1* | 8/2010 | Smith et al. ................... 370/254 |
| 2010/0254385 A1 | 10/2010 | Sharma et al. |
| 2011/0246899 A1* | 10/2011 | Kwon et al. .................. 715/736 |
| 2012/0185853 A1 | 7/2012 | Haviv et al. |
| 2013/0086236 A1* | 4/2013 | Baucke et al. ................. 709/223 |
| 2013/0125124 A1* | 5/2013 | Kempf et al. ...................... 718/1 |
| 2013/0223449 A1* | 8/2013 | Koganti et al. ............... 370/392 |
| 2013/0235874 A1* | 9/2013 | Ringdahl et al. ......... 370/395.53 |
| 2013/0238774 A1* | 9/2013 | Davison et al. ............... 709/223 |
| 2014/0059544 A1* | 2/2014 | Koganty et al. .................... 718/1 |
| 2014/0079070 A1* | 3/2014 | Sonoda et al. ................ 370/392 |
| 2014/0169215 A1* | 6/2014 | Rajendran et al. ............ 370/254 |
| 2014/0344439 A1* | 11/2014 | Kempf et al. ................. 709/224 |
| 2015/0071285 A1* | 3/2015 | Kumar et al. ................. 370/392 |

* cited by examiner

WORKLOAD BASED SERVICE CHAIN INSERTION IN A NETWORK ENVIRONMENT

TECHNICAL FIELD

This disclosure relates in general to the field of communications and, more particularly, to workload based service chain insertion in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for workload based service chain insertion in a network environment is provided and it could potentially include partitioning a service-path into fragments at a service controller, where the service-path comprises an ordered sequence of services to be provided to a packet associated with a workload in a network. The method also includes determining a location of service nodes providing the services; and provisioning the fragments at interfaces at a distributed virtual switch. The method could further include generating a plurality of service insertion points corresponding to the fragments at a service dispatcher. The service dispatcher can include a plurality of data plane components, and the service insertion points are generated at the data plane components.

Example Embodiments

Figure 1:
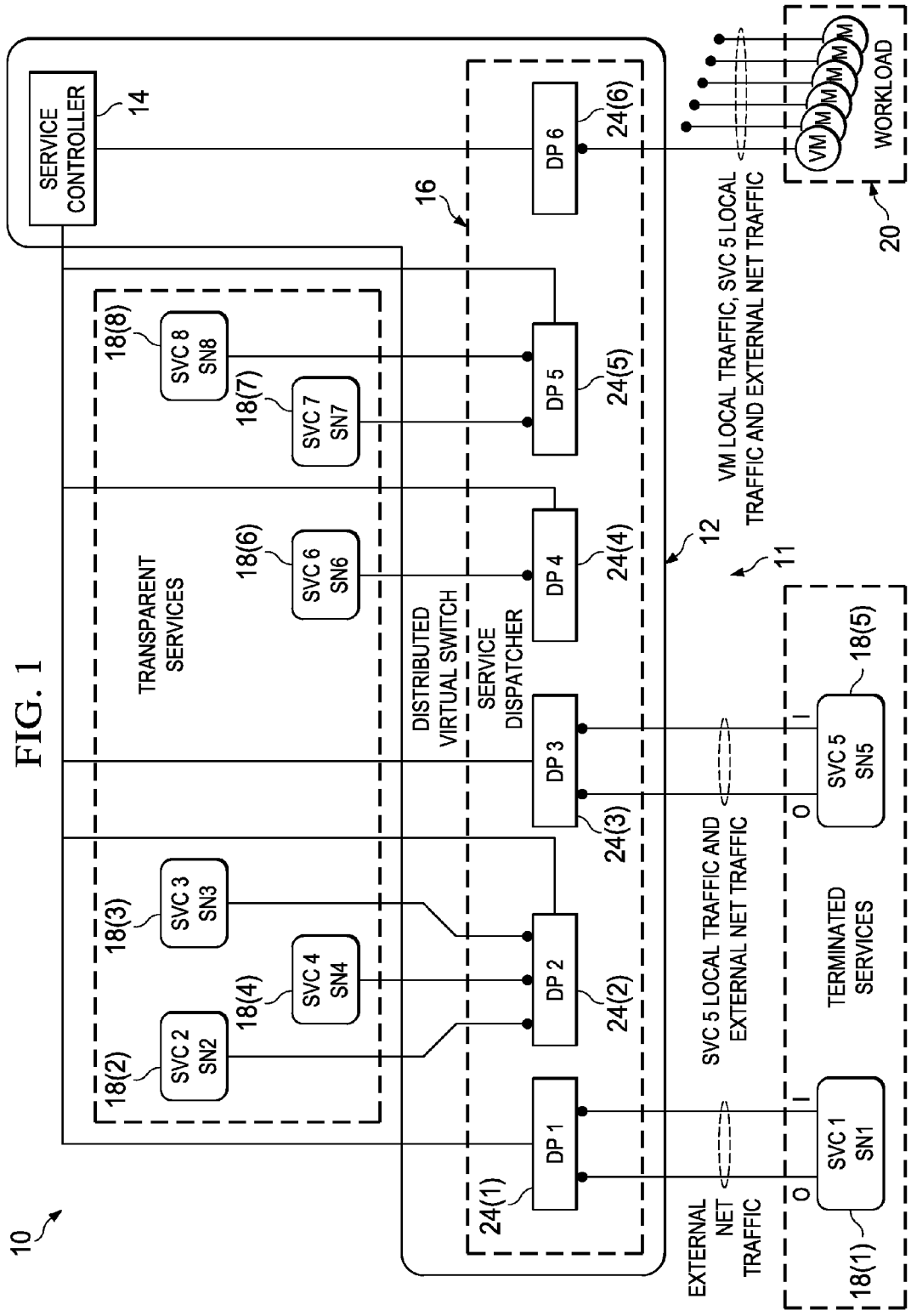
FIG. 1 is a simplified block diagram illustrating a communication system for workload based service chain insertion in a network environment.

Turning to FIG. 1, FIG. 1 is a simplified block diagram illustrating a communication system 10 for workload based service chain insertion in a network environment in accordance with one example embodiment. FIG. 1 illustrates a network 11 (generally indicated by an arrow) comprising a distributed virtual switch (DVS) 12. DVS 12 can include a service controller 14 and a service dispatcher 16. A plurality of service nodes (SN) 18 (e.g., SNs 18(1)-18(8)) may provide services to packets entering or leaving network 11. A plurality of virtual machines (VMs) may provide a workload 20 on DVS 12, for example, by generating or receiving packets through DVS 12. One or more data planes (DPs) 24 (e.g., DPs 24(1)-24(6)) included in service dispatcher 16 may facilitate packet forwarding by DVS 12.

Embodiments of communication system 10 can facilitate inserting a service-path in a simple, low-touch and workload focused manner. As used herein, the term "service-path" includes an ordered sequence of a plurality of services provided by one or more SNs (e.g., applications, virtual machines, network appliances, and other network elements that are configured to provide one or more network services) in the network. A "service" may include a feature that performs packet manipulations over and beyond conventional packet forwarding. Examples of services include encryption, decryption, intrusion management, firewall, load balancing, wide area network (WAN) bandwidth optimization, application acceleration, network based application recognition (NBAR), cloud services routing (CSR), virtual interfaces (VIPs), security gateway (SG), network analysis, etc. The service may be considered an optional function performed that in a network that provides connectivity to a network user. The same service may be provided by one or more SNs within the network.

Services may include terminated services and transparent services. A "terminated service" is a service performed on substantially all traffic entering or exiting network 11. Examples of terminated services include edge firewall, server load balancing, etc. Service nodes providing terminated services may use two virtual Ethernet interfaces (vETHs) each, one interface for traffic entering the service node, and the other interface for traffic exiting the service node. Service nodes providing terminated services are directly in the path of the traffic. A "transparent service" is a service performed on a portion of the traffic flowing through network 11. Transparent services may be optional (e.g., based on user subscriptions, traffic type, etc.). Examples of transparent services include application firewalls, segmentation firewalls, encryption, decryption, intrusion detection, intrusion prevention, network analysis, wide area network optimization, etc. Service nodes providing transparent services may use one vETH each, common to traffic entering the service node and exiting therefrom. Moreover, traffic has to be steered towards service nodes providing transparent services (i.e., such service nodes are not necessarily in the path of the traffic, unless traffic is pushed to them).

According to some embodiments, a user (e.g., system administrator) can configure the service-path and provision it directly at workload 20. Service controller 14 may segment the user configured service-path into smaller service-path fragments. Service dispatcher 16 may orchestrate the service-path fragments in a manner transparent to SNs 18(1)-18(8). Service controller 14 and service dispatcher 16 can together chain SNs 18(1)-18(8) as configured (e.g., provisioned) by the user at workload 20.

As used herein, the term "service controller" includes a process (e.g., instance of a computer program that is executing) that can provision services at one or more service nodes according to preconfigured settings. The preconfigured settings may be provided at the service controller by a user through an appropriate command line interface, graphical user interface, script, or other suitable means. The term "service dispatcher" includes one or more network interfaces (e.g., virtual Ethernet modules (VEMs)), at least some portions of switching hardware and associated firmware and software, and one or more processes managing the one or more network interfaces to facilitate packet switching in a distributed switch, including a distributed virtual switch.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Insertion of services in a non-virtual data center environment is typically high touch, rigid and topology-centric. Each insertion may change upstream router or switch configuration (e.g., topology) of services within the network environment. Moving the services can be equivalent to adding new services in terms of effort and impact. In such an environment, workloads are deployed to satisfy service constraints (rather than the other way around). The non-virtual data center approach to service insertion cannot be adapted in a virtual data center (VDC) environment for various reasons. Typically, workloads in the VDC environment are not bound by service constraints and policies. The VDC environment is dynamic—both workloads and services serving the workloads are mobile to adapt to dynamic resource allocation and policy changes. Workloads and services may be scaled up or down based on the load (e.g., traffic) in the network. An attempt to employ non-VDC approach in VDC can take away the dynamism and the benefits that VDC offers.

Inserting a service-path (rather than a single service) can also be problematic, if not more so, for example, because the sequence of services in the service-path has to match delivery of the services in the specific sequence. The service-path can be complex when it has a terminated service (such a server load balancer or firewall in the native traffic path) as such a service can change the flow specification (e.g., NAT). Moreover, the service order reverses when the traffic reverses its direction in the same flow of a connection. Generally, an ordered set of services in the network that includes terminated services and transparent services, while maintaining the dynamic nature of both the workloads and services may not be inserted in the currently existing infrastructure of the VDC environment without major system overhauls.

In some scenarios, service insertion architecture (SIA) may be implemented to perform service chain insertion. However, SIA is typically applicable for non-VDC environments. SIA is service centric in its provisioning and orchestration of the service chains. From an end user perspective, SIA does not insert services at the workload, but instead requires the end user to insert the services at switch or router interfaces. SIA requires SNs to participate actively in the service chain and to be aware of chains, of which they are a part.

In some VDC environments, service insertion may be implemented through appropriate service profiles and port profiles. SNs may be configured by assigning an Internet Protocol (IP) address and a predefined service profile (e.g., a predefined container or object that identifies network policies to be enforced at the service node). The service profiles may be bound to port profiles of individual VMs in the VDC network. A service node device and policy manager (VNMC) controls multiple instances of the SNs. The VNMC interfaces with the VM management control center to fetch existing VMs and their corresponding attributes; to learn of new VMs coming online; and to provision appropriate policies for the newly created VMs in the corresponding SNs to allow the SNs to maintain a stateless configuration.

SNs obtain their respective configurations by retrieving the configurations in mode/option form from a central repository that stores the configurations. Accordingly, when a SN comes online, it pulls the configuration from the controlling VNMC or with permission from an associated database. In such a scheme, a user (e.g., system administrator) has to manually configure appropriate service-paths at the VNMC and store the service-paths in respective configurations of the appropriate SNs. SNs have to be manually identified and provisioned suitably. When the number of SNs increases, as is the case in large VDC environments, manual configuration and provisioning can lead to inefficient operations.

Communication system 10 is configured to address these issues (and others) in offering a system and method for workload based service chain insertion in a network environment. Embodiments of communication system 10 may insert a chain of ordered services in the VDC environment using service controller 14, service dispatcher 16, SNs 18, and workload 20. In an example embodiment, using Cisco N1K virtual switch, a virtual supervisor manager (VSM) with command line interface (CLI) may operate as service controller 14, vPath on N1KV virtual Ethernet Module (VEM) may operate as SD 16, and any of network services, including Cisco vACE, vWAAS, ASA1KV, NBAR, NAM, etc. may operate as SNs 18.

According to various embodiments, a user may configure (e.g., provision, arrange, organize, construct, etc.) the service-path at SC 14. The service-path may be configured by specifying relevant SN 18(1)-18(8), including its reachability and adjacency among other SNs, associated service-profile, and any additional attributes (e.g., virtual IP address (VIP) in the case of Server Load Balancer). An example configuration of the service-path on N1KV VSM may include VSG provided at SN 18(7), followed by vACE provided at SN 18(5), followed by vWAAS provided at SN 18(2), and followed by vASA provided at SN 18(1). The user may configure a forward service-path (for packets destined to workload 20) to be: vSG→vACE→vWAAS→vASA; and a reverse service-path (for packets sourced from workload 20) to be: vASA→vWAAS→vACE→vSG.

The user may provision the service-path at workload 20 (rather than individual SNs 18). The service-path may be provisioned in a port profile associated with specific workload 20, thereby binding the service policy including the service-path with the network policy included in the port profile. SC 14 may automatically identify appropriate SNs 18(1)-18(8) (including their respective locations) that are relevant to the configured service-path. In some embodiments, automatic identification may be achieved based on reachability information configured in the service-path and appropriate information (e.g., SN type) provided in port profiles of the respective SNs 18(1)-18(8). SD 16 may learn the SN locations and propagate the information to SC 14 in some embodiments.

SC 14 may partition (e.g., decompose, divide, segregate, split, break-up, separate) the configured service-path into a plurality of service-path fragments. In an example embodiment, each terminated service in the service-path may form a boundary for fragmentation. For example, turning to the example service-path SP1: vSG→vACE→vWAAS→vASA, the service-path may be fragmented at vACE and vASA, which are terminated services. Fragment f1 may comprise f1: vSG→vACE, fragment f2 may comprise f2: vACE→vWAAS→vASA; and fragment f3 may comprise f3: vASA. In the reverse service-path (SP2: vASA→vWAAS→vACE→vSG), the service-path may be fragmented as follows: Fragments f1: vASA; f2: vASA→vWAAS→vACE; f3: vACE→vSG. In some embodiments, despite fragmenting the service-paths into three fragments f1, f2 and f3, only two service-path identifiers (e.g., SP1 and SP2) may be used to identify the service-path. Each SN 18(1), 18(2), 18(5) and 18(7) in the service-path may be assigned a sequence number in both the service-paths SP1 and SP2 and the sequence numbers may remain intact even after fragmenting. The service-path and sequence number can form a tuple <service_path_id, sequence_number> that identifies a service instance.

SC 14 may provision the service-path fragments at each DP 24(1)-24(6). As SC 14 learns the locations of appropriate SNs 18(1)-18(8) relevant to the configured service-paths, SC 14 may provision the service-path fragments at respective DP 24(1)-24(6) hosting the specific port associated with appropriate SNs 18(1)-18(8). In the example service-path configuration discussed herein, the service instance identified by <SP1, f1> (e.g., vSG→vACE) may be provisioned by SC 14 at a switch port (e.g., at DP 24(6)) of workload 20, the service instance identified by <SP1,f2> (e.g., vACE→vWAAS) may be provisioned at a switch port (e.g., at DP 24(3)) of SN 18(5)) and the service instance identified by <SP1, f3> (or vASA) may be provisioned at the outside-facing port (e.g., at DP 24(1)) of SN 18(1). The reverse fragments may be similarly programmed at the corresponding switch ports.

SD 16 may orchestrate the service-path fragments at each DP 24(1)-24(6) after receiving information on the service-path and relevant SNs. Traffic entering or flowing through network 11 may include local traffic (e.g., traffic local to workload 20, traffic local to network 11) and external traffic (e.g., traffic from/to wide area network (WAN) to which network 11 is connected). SD 16 may intercept the traffic at the configured switch-port, assign a service-path if the traffic is not on service-overlay and steer the traffic to the next SN in the service-path on an overlay network. If the traffic is already on the overlay, the traffic may be simply forwarded to the next SN for the service-path in the overlay encapsulation. The next SN is determined by using <service-path, sequence-number> tuple in the encapsulation and the provisioned fragment for the same service-path at the appropriate DP.

Turning to the example service-path, a WAN packet entering network 11 at DP 24(1) may be intercepted by DP 24(1), classified to use service-path tuple <SP2, f1>, and steered on overlay to vASA at SN 18(1). The packet when sent out of vASA at SN 18(1) may continue on the overlay network and head to its natural destination (e.g., vACE VIP at SN 18(5)). DP 24(3) hosting vACE at SN 18(5) may intercept and update the service-path tuple to <SP2, f2>. DP 24(3) may consult the local service-path table before sending the packet on the overlay to vWAAS at SN 18(2). The process can continue until the packet reaches the workload port at DP 24(6), where it is fully decapsulated after service by vSG at SN 18(7) at DP 24(6), where the service-path ends. The service-path tuple before decapsulating is <SP2, f4>. A similar sequence of events may carry the packet originating from workload 20 to the WAN on an overlay network.

Note that the activities as described herein may include more operations (e.g., optimizations, etc.) to simplify the discussion. For example, the service-path can be represented as a single service-path instead of a forward service-path and a reverse service-path. In such an implementation, the sequence-number of the service-path fragment may be incremented or decremented based on the direction. When workload 20 moves, the same service-path can stay with workload 20 by virtue of dynamic service provisioning policies, which move with workload 20. Likewise, when workload 20 is scaled up using the same port-profile, the same service-path may continue to apply. As with workload 20, movements of SNs 18(1)-18(8) may not change the service-paths, although the location of providing the service along the service-path may change. SD 16 may learn the new locations of SNs 18(1)-18(8) automatically, without manual user intervention, and propagate the information to SC 14. SC 14 may provision the service-path at the new location and the operations may execute seamlessly.

Embodiments of communication system 10 can provide various advantages. User intervention can be limited to configuring the service-path from a workload perspective, provisioning it to workload 20 and identifying relevant SNs 18(1)-18(8) to DVS 12. SC 14 may learn the SN location and provision the services at different SNs 18(1)-18(8) in network 11, without manual user intervention. SC 14 may partition the service-path to enable the use of the same service-path for traffic entering at different points in the service-path. Mobility and scalability of SNs 18(1)-18(8) or workload 20 may not affect service-path deployment. Traffic can be classified once at the traffic entry point to place it on to the service overlay and from thereon, traffic can be kept on the overlay up to workload 20 as services are delivered. Intermediate service intelligent switches (e.g., DPs 24(1)-24(6)) may simply look at the service-path header in the overlay to steer the traffic to the right SNs. SNs 18(1)-18(8) can be simple, passive entities oblivious to the service chains of which they are a part.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, services nodes 18(1)-18(8) represent a specific functionality (e.g., provision of a specific service) and may be embodied in one or more physical appliances. For example, some services nodes (e.g., service nodes 18(2) and 18(3)) may be provided in a common network element, whereas some other service nodes (e.g., 18(1) and 18(6)) may be stand-alone network elements that are configured to exclusively provide the respective specific service. Note that although only eight service nodes 18(1)-18(8) are illustrated in FIG. 1, any number of service nodes and corresponding services may be provided within the broad scope of the embodiments.

In various embodiments, workload 20 may be separate computing devices running applications (e.g., server/client applications in client-server network architecture). In other embodiments, workload 20 may be separate virtual machines on the same or different computing devices (e.g., server blades in a data center). In some embodiments, workload 20 may include server blades configured in one or more chassis. DVS 12 may include physical and virtual switches and can include any suitable network element capable of receiving packets, and forwarding packets appropriately in a network environment. Any number of workload may be active within network 11 within the broad scope of the embodiments.

SD 16 can include virtual interfaces (e.g., virtual equivalent of physical network access ports) that maintain network configuration attributes, security, and statistics across mobility events, and may be dynamically provisioned within virtualized networks based on network policies stored in DVS 12 as a result of VM provisioning operations by a hypervisor management layer. SD 16 may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with DPs 24(2)-24(6), transparent mobility of VMs across different physical servers and different physical access-layer switches within an enterprise network may be possible. DPs 24(2)-24(6) may provide intelligent traffic steering (e.g., flow classification and redirection), and fast path offload for policy enforcement of flows. DPs 24(2)-24(6) may be configured for multi-tenancy, providing traffic steering and fast path offload on a per-tenant basis. Although only six DPs 24(1)-24(6) are illustrated in FIG. 1, any number of DPs may be provided within the broad scope of the embodiments of communication system 10.

In one example embodiment, SC 14 may be an application coupled with a management module (e.g., virtual supervisor module (VSM)) of DVS 12. In another embodiment, SC 14 may be a stand-alone application (e.g., provisioned in a suitable network element) separate and distinct from DVS 12 and communicating therewith through appropriate communication links. In some embodiments, SC 14 may be provisioned in the same local area network as workload 20. In other embodiments, SC 14 may be provisioned in a different local area network separate and remote from workload 20. SC 14 may include a graphical user interface (GUI) based controller, or a CLI based controller, or a combination thereof.

Figure 2:
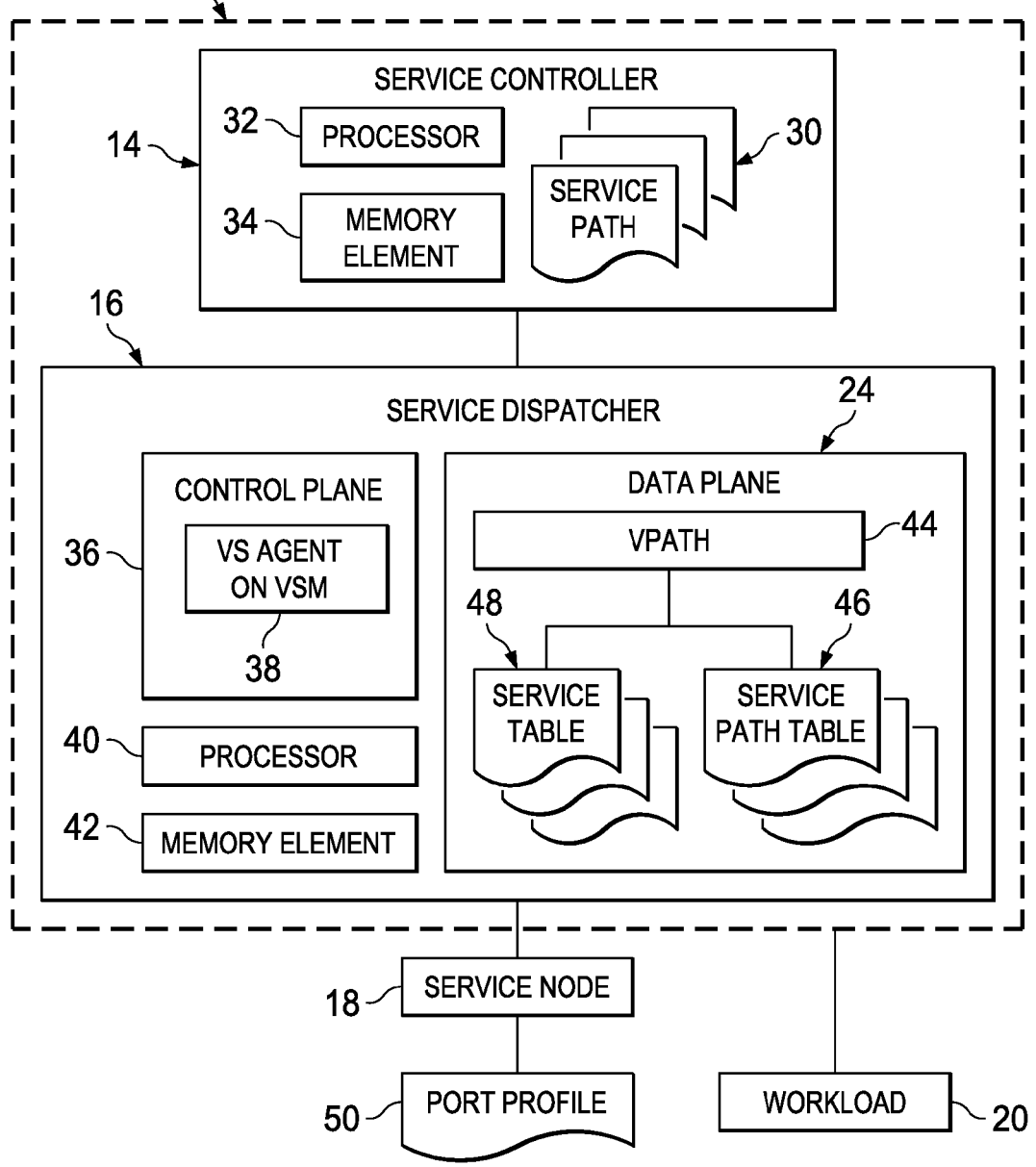
FIG. 2 is a simplified block diagram illustrating example details of an embodiment of the communication system.

Turning to FIG. 2, FIG. 2 is a simplified block diagram illustrating example details that may be associated with an embodiment of communication system 10. DVS 12 includes SC 14 and SD 16 and may be connected to example SN 18 and workload 20. SC 14 may include a processor 32 and a memory element 34. A service-path 30 may be provisioned in SC 14. SD 16 may include an example control plane 36 and an example data plane 24. Example control plane 36 may include a virtual switch (VS) agent on VSM 38, a processor 40 and a memory element 42. In some embodiments, processor 40 may be substantially identical to processor 32. Likewise, memory element 42 may be substantially identical to memory element 34 in some embodiments. In such embodiments, SC 14 and VS agent on VSM 38 may be provisioned on VSM at a common server in the network.

DP 24 may include a vPath 44. vPath is not intended to be a proprietary system or label of a proprietary system, but rather refers in a general sense to an overlay network architecture facilitated by suitable data plane components of SD 16 that can facilitate forwarding packets to service nodes (e.g., service node 18) within network 11 in a manner transparent to workload 20. vPath 44 can provide data plane functionalities for DVS 12, steering traffic to and from virtual interfaces within the network. vPath 44 can be provisioned with a service-path table 46 and a service table 48. In various embodiments service-path table 46 and service table 48 may include suitable data structures, tables, and other data objects to store service path and service node information appropriately. Service-path table 46 may include the list of service-paths managed at the specific DP 24. For example, service-path table 46 may include the service path SP1: SN7, SN6, indicating a service sequence of service-path SP1 at DP 24 of service nodes named SN7 and SN6. Service table 48 may indicate the interface on DP 24 to which traffic is to be steered to receive the services. For example, service table 48 may indicate the interface for a specific service-path (e.g., WL-port-ingress: SP1; WL-port-egress: SP2). SD 16 may build service-path table 46 and service table 48 based on configuration settings at SC 14. A port profile 50 may be associated with service node 18. Port profile 50 may include a service node type, for example, to enable identification of service node 18 in network 11.

Figure 3:
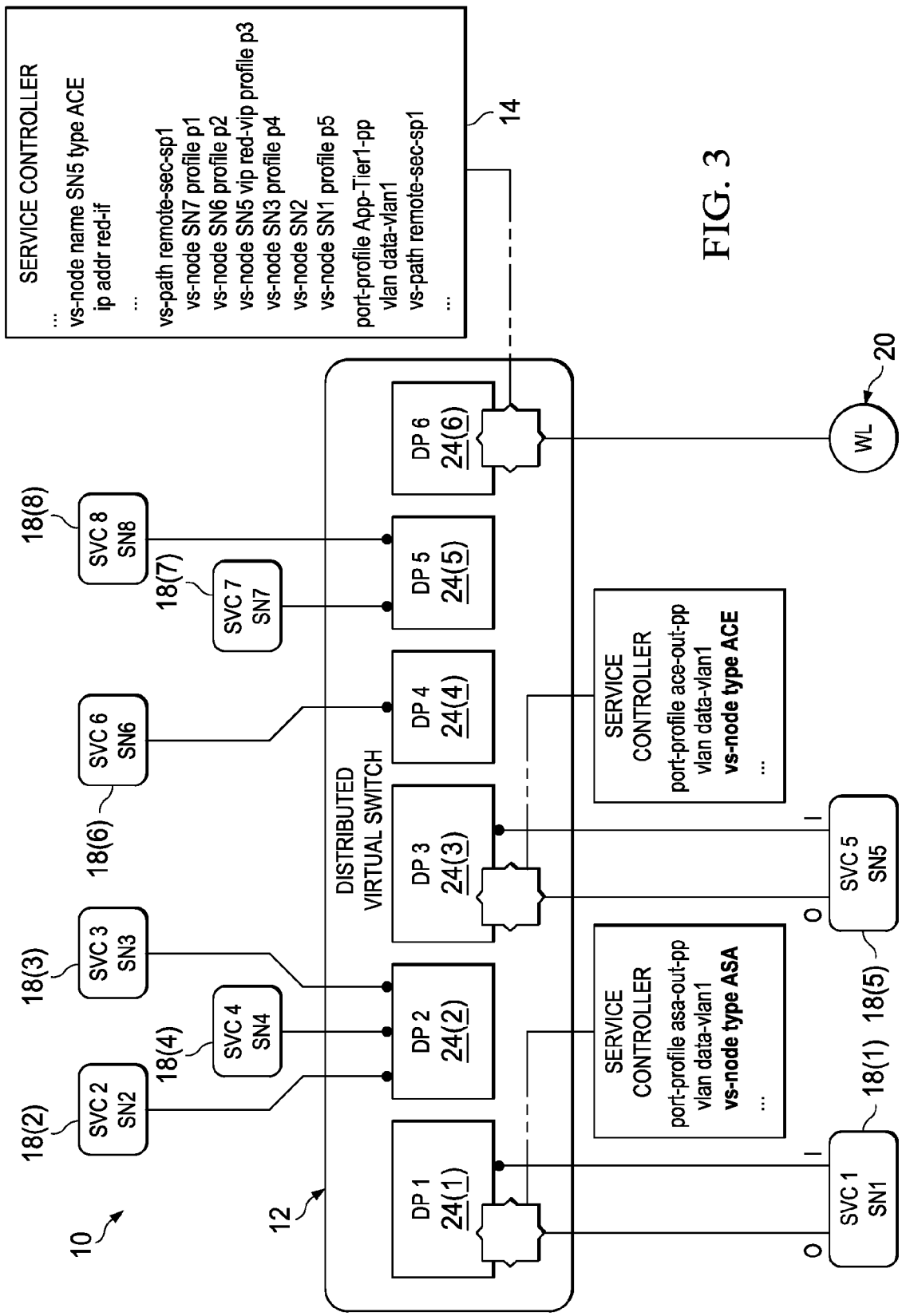
FIG. 3 is a simplified block diagram illustrating other example details of an embodiment of the communication system.

Turning to FIG. 3, FIG. 3 is a simplified block diagram illustrating example details of operation that may be associated with an embodiment of communication system 10. SC 14 may be configured with the attributes of appropriate SNs 18(1)-18(8) to be used in the service-path and the configurations may be applied to workload 20. For example, the attributes can include service node name (e.g., SN5), type (e.g., ACE), IP address (e.g., red-if). SC 14 may also be configured with service-paths (e.g., vs-path) including the specific sequence of service nodes therein (e.g., SN7 with profile p1, SN5 with profile p2, etc.). In some embodiments, SC 14 may be preconfigured with a default sequence of services (e.g., services to be provided in the same sequence as they are entered in the configuration), which the user can over-ride by specifying the particular sequence of services. In other embodiments, there may be no default sequence, and the user would have to specify the sequence for the service-path to be operational.

In the example configuration illustrated in the FIGURE, SC 14 is configured with service-path "remote-sec-sp1" to be: vSG→vIPS→vACE→vNBAR→vWAAS→vASA, provided by SNs 18(7), 18(6), 18(5), 18(3), 18(2) and 18(1), respectively. Among the listed services, vACE, corresponding to SN 18(5) and vASA, corresponding to SN 18(1) are terminated services, and the other listed services are transparent services. According to embodiments of communication system 10, the entire service-path, irrespective of the presence of any terminated services therein, may be configured at SC 14. SC 14 may also be configured with port profiles of the interfaces at which the service is to be delivered, for example, port profile App-Tier1-pp, etc. Services may be provided on an overlay network managed by SD 16, through DPs 24(1)-24(3).

In various embodiments, the service node types of SNs 18(1)-18(8) may be included in the port profiles associated with the respective SNs 18(1)-18(8). For example, the port profile of SN 18(5) configured at SC 14 may indicate that the service node type is ACE; similarly, the port profile of SN 18(1) configured at SC 14 may indicate that the service node type is ASA; etc. SC 14 may determine the locations of respective service nodes 18(1)-18(8) from the service node types specified in the respective port profiles configured on SC 14.

During provisioning, SC 14 may determine the location of SNs 18(1)-18(8), partition the configured service-paths into smaller fragments, and provision them at the appropriate locations. For example, SC 14 may partition remote-sec-sp1 into f1: vSG→vIPS→vACE, provisioned on DP 24(6) at the appropriate interface (e.g., vETH); f2: vACE→vNBAR→vWAAS→vASA provisioned on DP 24(3); and f3: vASA, provisioned on DP 24(1). In some embodiments, SC 14 may initially generate two service-paths from the configured service-path, a first service-path for forward traffic (e.g., traffic from workload 20), and a second service-path for reverse traffic (e.g., traffic to workload 20), and subsequently partition both the first service-path and the second service-path into fragments.

Figure 4:
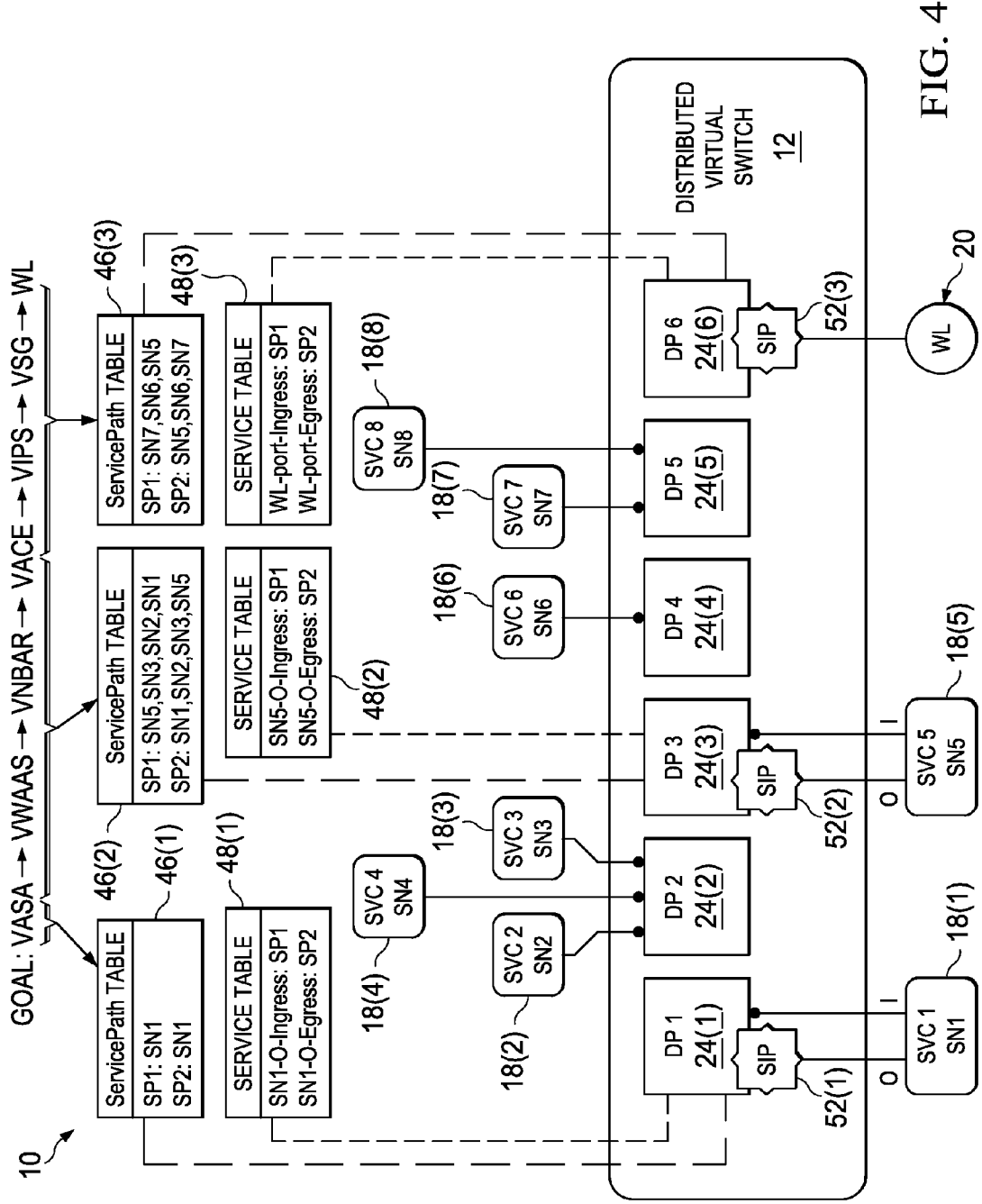
FIG. 4 is a simplified block diagram illustrating yet other example details of an embodiment of the communication system.

Turning to FIG. 4, FIG. 4 is a simplified block diagram illustrating example details of an embodiment of communication system 10. SD 16 may generate service insertion points (SIPs) 52(1)-52(3) to provide the services according to the provisioning by SC 14. For example, turning back to the example of the service path vSG→vIPS→vACE→vNBAR→vWAAS→vASA, provided by SNs 18(7), 18(6), 18(5), 18(3), 18(2) and 18(1), respectively, which was fragmented by SC 14 into three fragments: f1: vSG→vIPS→vACE, provisioned on DP 24(6) at the appropriate interface (e.g., vETH); f2: vACE→vNBAR→vWAAS→vASA provisioned on DP 24(3); and f3: vASA, provisioned on DP 24(1), SD 16 may provide fragment f1 at SIP 52(3); fragment f2 at SIP 52(2); and fragment f1 at SIP 52(1).

DP 24(1) may build service-path table 46(1) and service table 48(1) to facilitate provision of the appropriate services associated with SIP 52(1); DP 24(3) may build service-path table 46(2) and service table 48(3 to facilitate provision of the appropriate services associated with SIP 52(2) and DP 24(6) may build service-path table 46(3) and service table 48(3) to facilitate provision of the appropriate services associated with SIP 52(3). For example, service-path table 46(1) may indicate the service provided by SN 18(1) and service table 48(1) may indicate the ingress and egress ports at which the services are to be provided (e.g., O-Ingress: SP1; O-Egress: SP2); etc.

Figure 5:
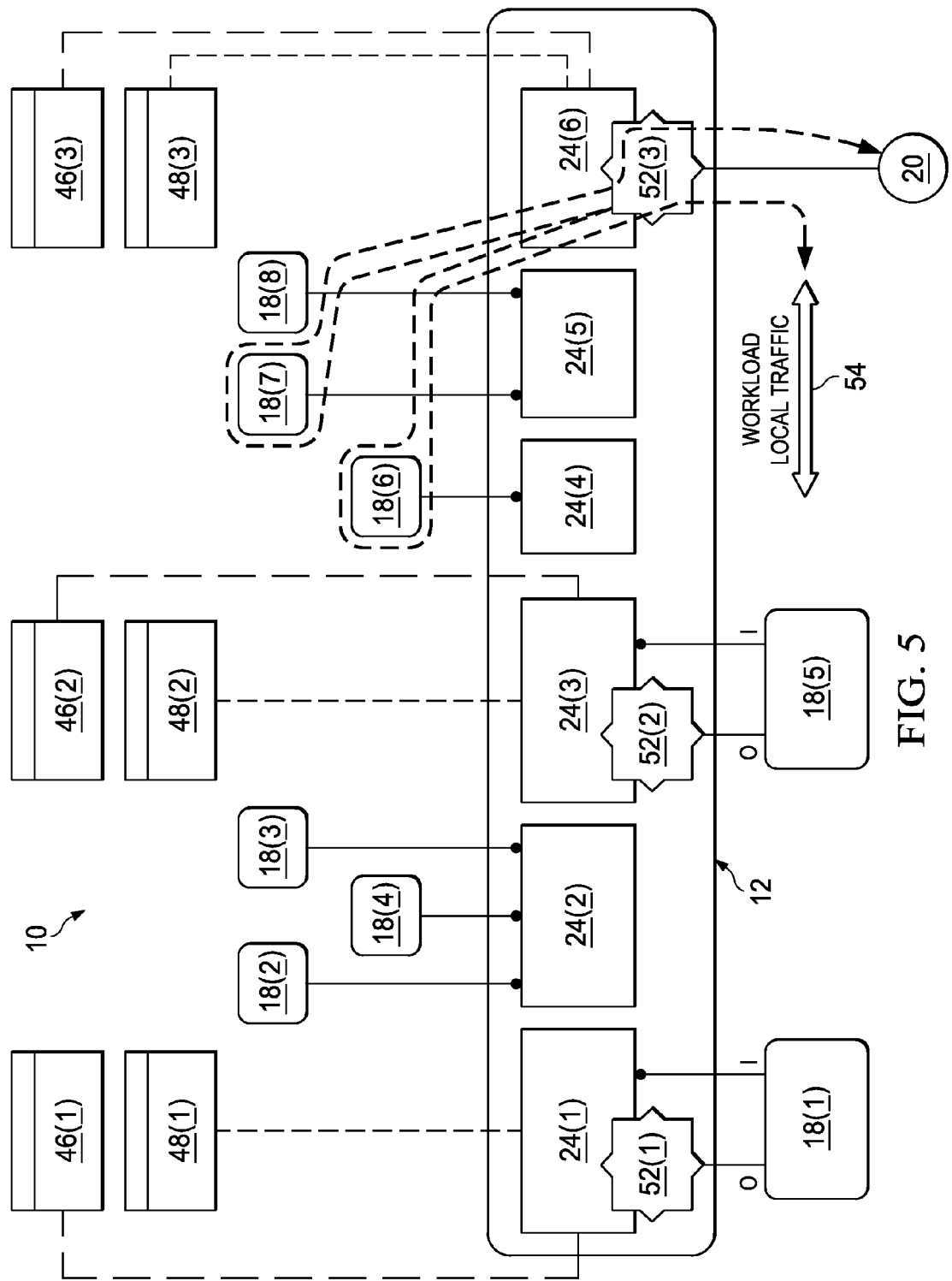
FIG. 5 is a simplified block diagram illustrating yet other example details of an embodiment of the communication system.

Turning to FIG. 5, FIG. 5 is a simplified block diagram illustrating example details of an embodiment of communication system 10. During operation, workload local traffic 54 that enters from and exits into workload 20 at SIP 52(3) may be serviced only by services provisioned at SIP 52(3) on DP 24(6), although the service path may include other services at other service nodes. For example, workload local traffic may be routed from workload 20 through SNs 18(7) (e.g., providing vSG services) and 18(6) (e.g., providing vIPS services) even though the service path configured at SC 14 may include vSG→vIPS→vACE→vNBAR→vWAAS→vASA. Thus, although the user may have configured a long service path at SC 14, embodiments of communication system 10 can fragment the service path intelligently, provision them on DVS 12 appropriately, and provide services to the appropriate portion of traffic to which the service path may be applicable.

Figure 6:
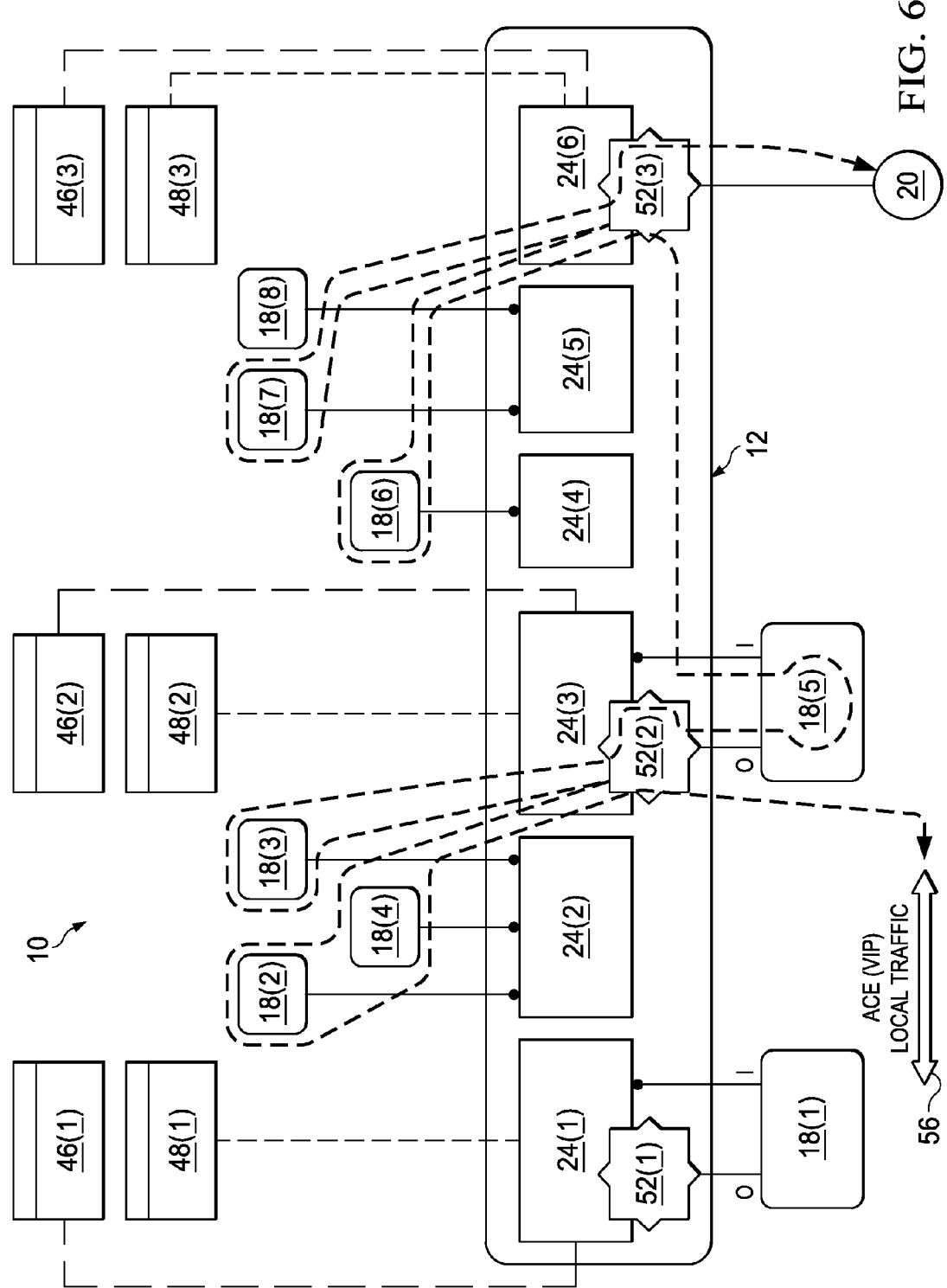
FIG. 6 is a simplified block diagram illustrating yet other example details of an embodiment of the communication system.

Turning to FIG. 6, FIG. 6 is a simplified block diagram illustrating example details of an embodiment of communication system 10. During operation, ACE (VIP) local traffic 56 (e.g., traffic from workload 20 to another entity (e.g., VM) inside or outside network 11 through SN 18(5) and from the another entity inside or outside network 11 through SN 18(5) to workload 20) through SN 18(5) (which may provide ACE services, according to the example configuration illustrated in the FIGURE) at SIP 52(3) may be serviced by services provisioned at SIP 52(2) on DP 24(3) and SIP 52(3) on DP 24(6), although the service path may include other services at other service nodes. For example ACE (VIP) local traffic 56 from workload 20 may be serviced by service nodes SN 18(7), 18(6), 18(5), 18(3), and 18(2) in that order (e.g., vSG→vIPS→vACE→vNBAR→vWAAS) although the service path configured at SC 14 may include vSG→vIPS→vACE→vNBAR→vWAAS→vASA.

Figure 7:
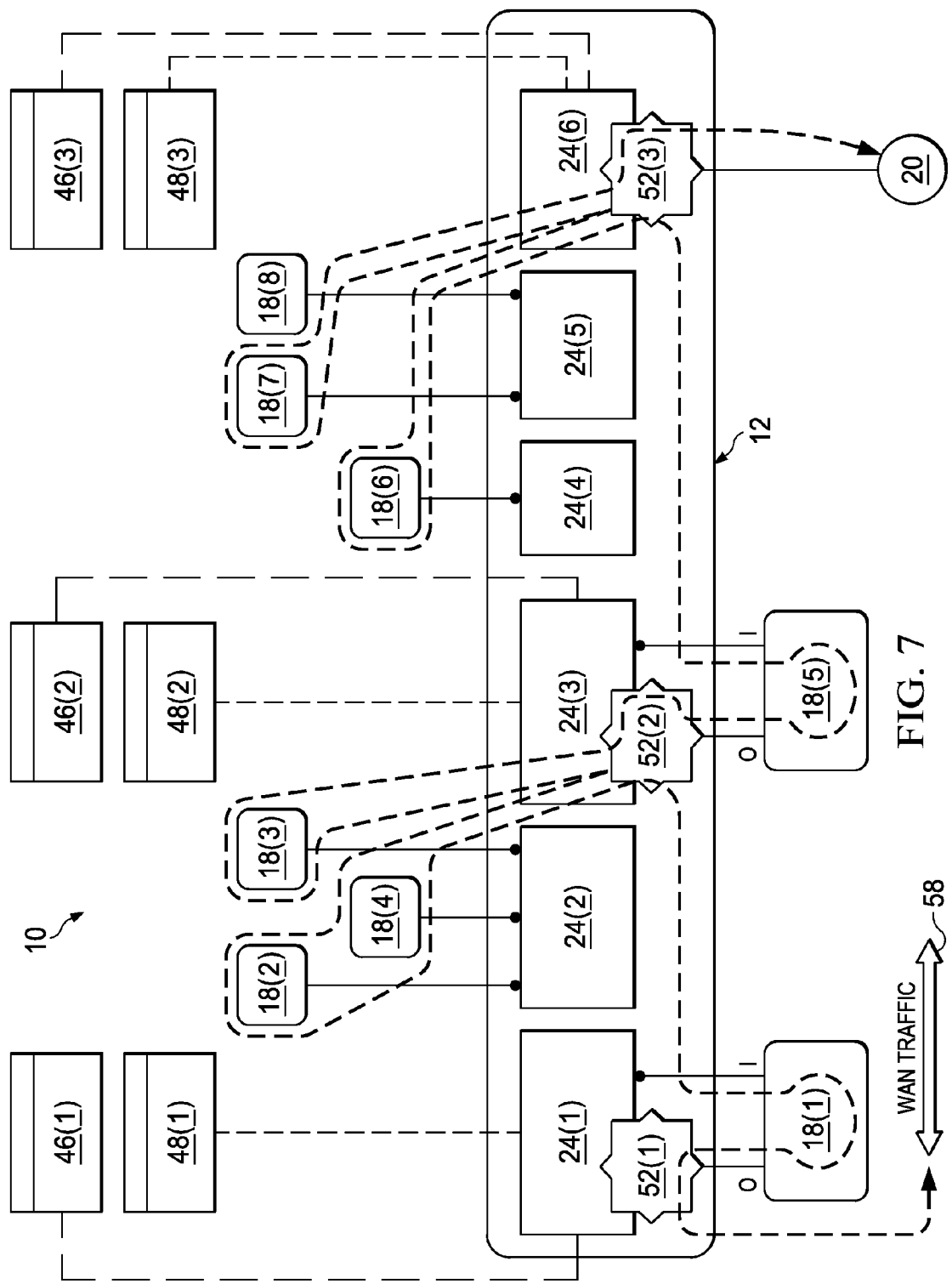
FIG. 7 is a simplified block diagram illustrating yet other example details of an embodiment of the communication system.

Turning to FIG. 7, FIG. 7 is a simplified block diagram illustrating example details of an embodiment of communication system 10. During operation, WAN traffic 58 (e.g., traffic to and from network 11 and destined to (or sourced from) workload 20) at SIP 52(1) may be serviced by services provisioned at SIP 52(1) on DP 24(1), SIP 52(2) on DP 24(3) and SIP 52(3) on DP 24(6), including the entire service-path. Thus, the user can configure the entire service-path for WAN traffic 58, and embodiments of communication system 10 can fragment the service path intelligently, provision them on DVS 12 appropriately, and provide services to the appropriate portion of traffic to which the service path may be applicable. For example WAN traffic 58 from workload 20 may be serviced by service nodes SN 18(7), 18(6), 18(5), 18(3), 18(2) and 18(1) in that order (e.g., vSG→vIPS→vACE→vNBAR→vWAAS→vASA), as specified by the service-path configuration in SC 14.

Figure 8A:
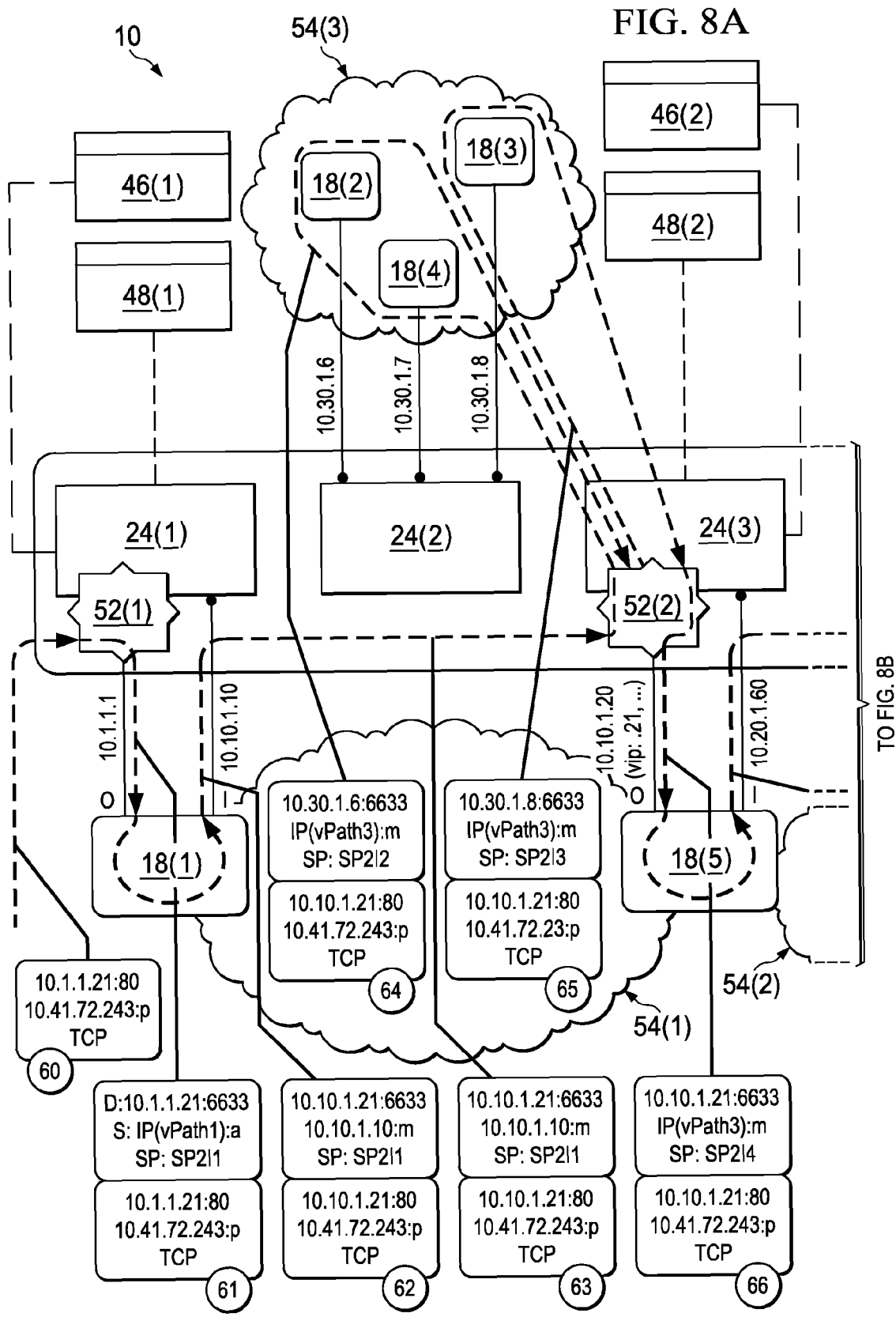
FIGS. 8A and 8B are simplified block diagrams illustrating yet other example details of an embodiment of the communication system.
Figure 8B:
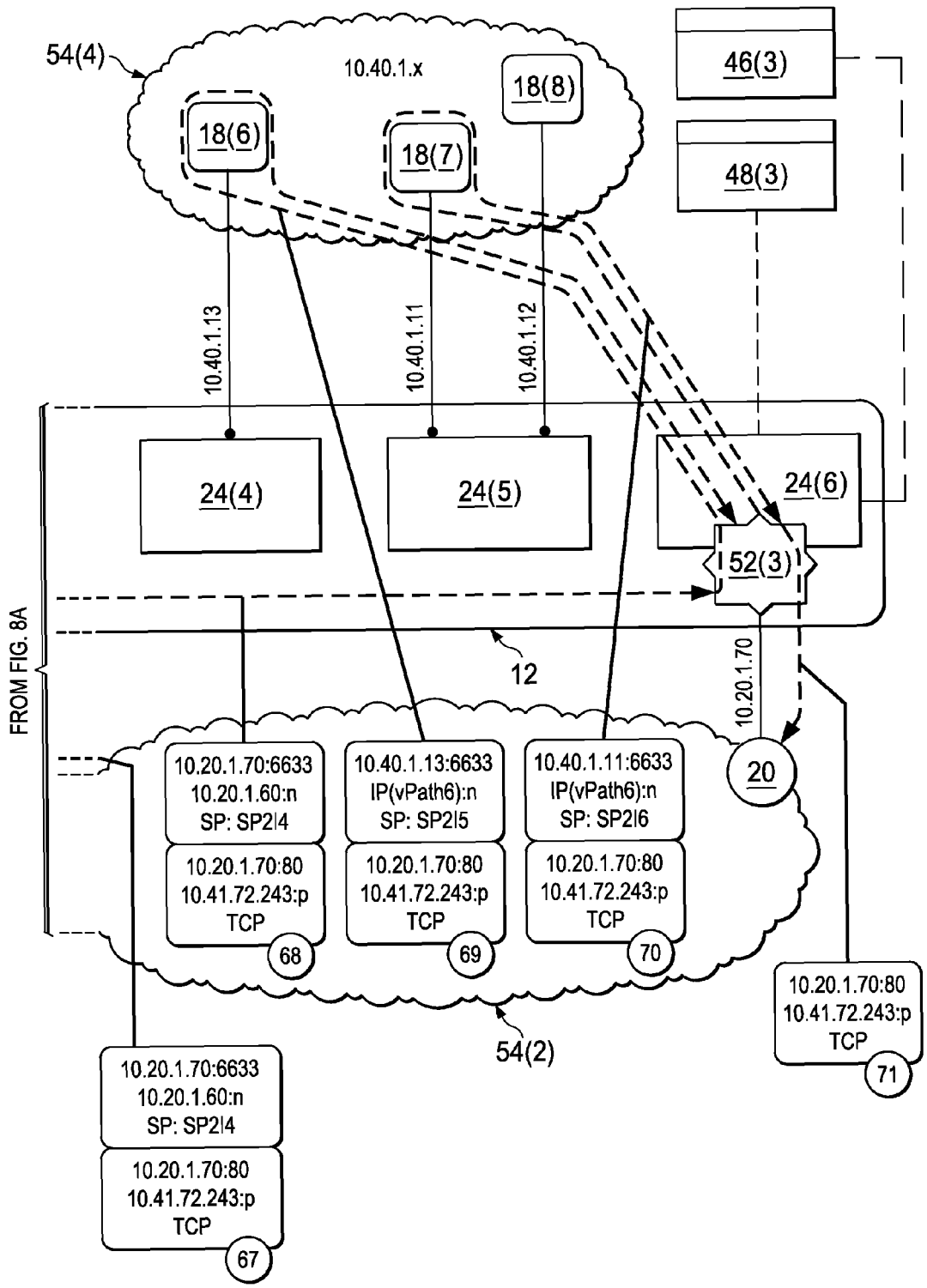

Turning to FIGS. 8A and 8B, FIGS. 8A and 8B are simplified block diagrams illustrating an example movement of traffic according to an embodiment of communication system 10. The service path configured on SC 14 may be as follows: vSG→vIPS→vACE→vNBAR→vWAAS→vASA for traffic from workload 20 to outside network 11, and the reverse sequence (e.g., vASA→vWAAS→vNBAR→vACE→vIPS→vSG) for traffic in the reverse direction.

Network 11 may include one or more subnets, for example, subnets 54(1)-54(4). IP addresses on subnets 54(1)-54(4) may be configured (merely for example purposes) as follows: addresses subnet 54(1) may be of the form 10.10.1.x; addresses on subnet 54(2) may be of the form 10.20.1.x; addresses on subnet 54(3) may be of the form 10.30.1.x; and addresses on subnet 54(4) may be of the form 10.40.1.x. Merely for example purposes, assume that SN 18(1) is on subnet 54(1), with both ingress and egress interfaces in the same subnet; SN 18(5) is on subnets 54(1) and 54(2), with ingress interface in subnet 54(1) and egress interface in subnet 54(2); SNs 18(2)-18(4) are on subnet 54(3); SNs 18(6)-18(8) are on subnet 54(4); and workload 20 is on subnet 54(2).

The ingress interface at SN 18(1) may have an IP address if 10.1.1.1, and the egress interface at SN 18(1) may have an IP address of 10.10.1.10. The interfaces at SNs 18(2)-18(4), may have the following IP addresses respectively (with both ingress and egress traffic sharing the same interface): 10.30.1.6; 10.30.1.8; and 10.30.1.7. The ingress interface at SN 18(5) may have an IP address if 10.1.1.20, and the egress interface at SN 18(5) may have an IP address of 10.20.1.60. The interfaces at SNs 18(6)-18(8), may have the following IP addresses respectively (with both ingress and egress traffic sharing the same interface): 10.40.1.13; 10.40.1.11; and 10.40.1.12. The interface at workload 20 may have an IP address of 10.20.1.70. Note that the IP addresses are listed here merely for illustrative purposes, and are not limitations of embodiments of communication system 10.

Assume, merely for the sake of example, and not as a limitation, that at 60, packet, with a destination address of 10.1.1.21 (IP address of the external facing subnet) on port 80 and a source address of 10.41.72.243, on a TCP port, enters network 11 at ingress port of SN 18(1), with an IP address of 10.1.1.1. At 61, DP 24(1) at SIP 52(1) places the packet on the overlay network within network 11, for example, by looking up service-path table 46(1), adding an overlay header (e.g., outer encapsulation) with a destination address of 10.1.1.21 on port 6633 (e.g., standard port number assigned by Internet Assigned Numbers Authority (IANA) for use by virtual services managing processes (e.g., vPath)), and a source address to indicate the overlay network (e.g., IP(vPath1):a), and a service-path to indicate the first node on service-path SP2 (e.g., SP: SP2|1). Note that the determination of which service-path should be applied may be based on various classification considerations that are outside the scope of the present disclosure. At 62, SN 18(1) services the packet appropriately; rewrites the packet header destination address to 10.10.1.21; rewrites the overlay header source address to its egress interface IP address of 10.10.1.10:m, and sends out the packet therefrom to DP 24(1). At 63, DP 24(1) reads the overlay header and forwards the packet to the next destination on the service-path, namely SP2|2 at SIP 52(2).

At 64, DP 24(3) at SIP 52(2) looks up service-path table 46(2); rewrites the overlay header destination address to 10.30.1.6 (IP address of interface of SN 18(2)); rewrites the overlay header source address to indicate the overlay network of DP 24(3) (e.g., IP(vPath3):m); rewrites the overlay header service path to indicate the second node on service path SP2 (e.g., SP2|2); and forwards the packet to SN 18(2). When the packet returns from SN 18(2) after processing, at 65, DP 24(3) looks up service-path table 46(2); rewrites the overlay header destination address to 10.30.1.8 (IP address of interface of SN 18(3)); rewrites the overlay header service path to indicate the third node on service path SP2 (e.g., SP2|3); and forwards the packet to SN 18(3). When the packet returns from SN 18(3) after processing, at 66, DP 24(3) looks up service-path table 46(2); rewrites the overlay header destination address to 10.10.1.21 (IP address of ingress interface of SN 18(5)); rewrites the overlay header service path to indicate the fourth node on service path SP2 (e.g., SP2|4); and forwards the packet to SN 18(5).

Turning to FIG. 8B, at 67, SN 18(5) processes the packet; rewrites the packet header destination address to 10.20.1.70 on port 80, which is the IP address of workload 20; rewrites the overlay header destination address to 10.20.1.70; and rewrites the overlay header source address to 10.20.1.60 on port n. At 68, DP 24(3) reads the overlay header and forwards the packet to the next destination on the service path, namely SP2|5. At 69, DP 24(6) at SIP 52(3) looks up service-path table 46(3); rewrites the overlay header destination address to 10.40.1.13 (IP address of interface of SN 18(6)); rewrites the overlay header source address to indicate the overlay network of DP 24(6) (e.g., IP(vPath6):n); rewrites the overlay header service path to indicate the fifth node on service path SP2 (e.g., SP2|5); and forwards the packet to SN 18(6). When the packet returns from SN 18(6) after processing, at 70, DP 24(6) looks up service-path table 46(3); rewrites the overlay header destination address to 10.40.1.11 (IP address of interface of SN 18(7)); rewrites the overlay header service path to indicate the sixth node on service path SP2 (e.g., SP2|6); and forwards the packet to SN 18(7). When the packet returns from SN 18(7) after processing, at 71, DP 24(6) looks up service-path table 46(3); decapsulates the overlay header; and forwards the packet to workload 20 at destination IP address 10.20.1.70.

Figure 9:
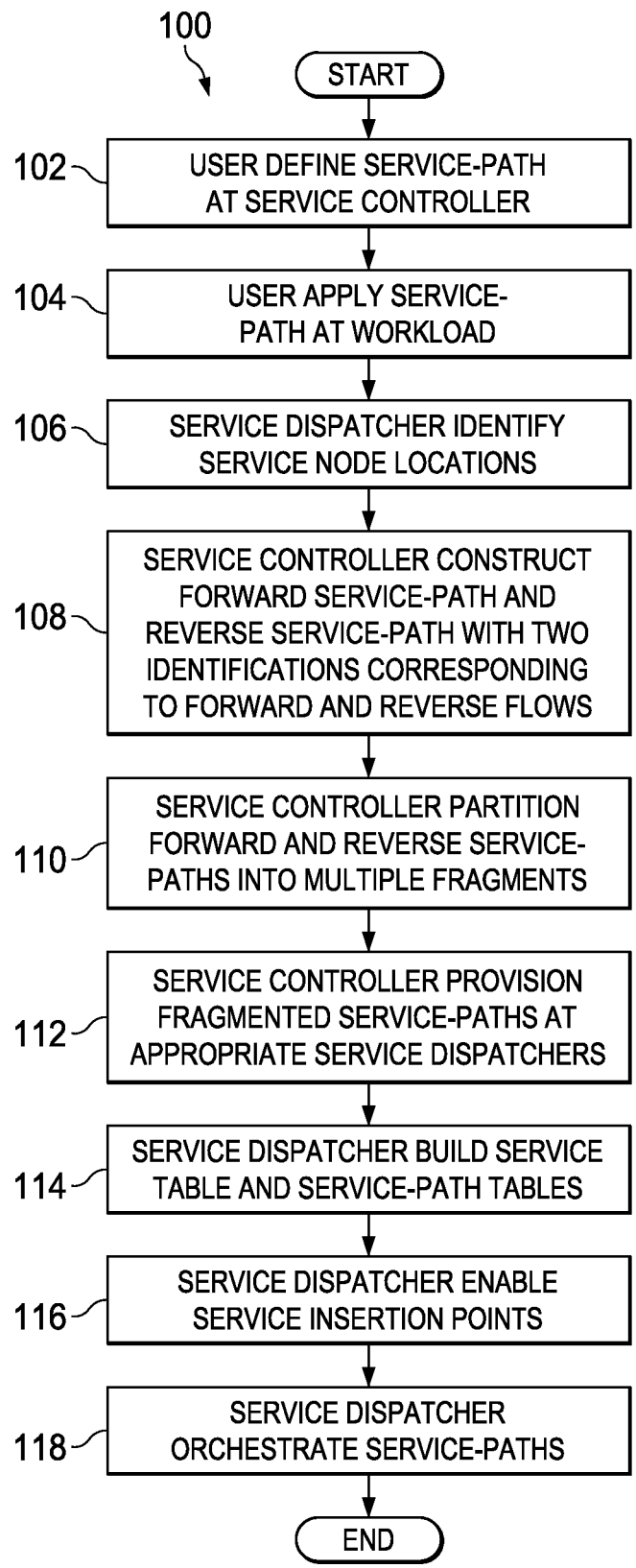
FIG. 9 is a simplified flow diagram illustrating example operations that may be associated with an embodiment of the communication system.

Turning to FIG. 9, FIG. 9 is a simplified flow diagram illustrating example operations 100 that may be associated with embodiments of communication system 10. At 102, the user may define a service-path at SC 14. At 104, the user may apply the service-path at workload 20. At 106, SD 16 may identify service node locations and provide the locations to SC 14. In another embodiment, SC 14 may determine the service node locations from the port profiles of the respective service nodes. At 108, SC 14 may construct a forward service-path and a reverse service path from the configured service path with two separate identifications corresponding to the forward and reverse flows, respectively, according to one embodiment. In some embodiments, alternatively, SC 14 may construct a single service-path with a direction indicator for forward and reverse flows.

At 110, SC 14 may partition forward and reverse service-paths into multiple fragments. In an example embodiment, the service-path may be partitioned at every terminated service in the service-path. At 112, SC 14 may provision fragmented service-paths at appropriate SD 16. At 114, SD 16 may build service-path table 46 and service table 48. At 116, SD 16 may enable SIPs 52 to facilitate service delivery. At 118, SD 16 may orchestrate service-paths when traffic is enabled through distributed virtual switch 12.

Figure 10:
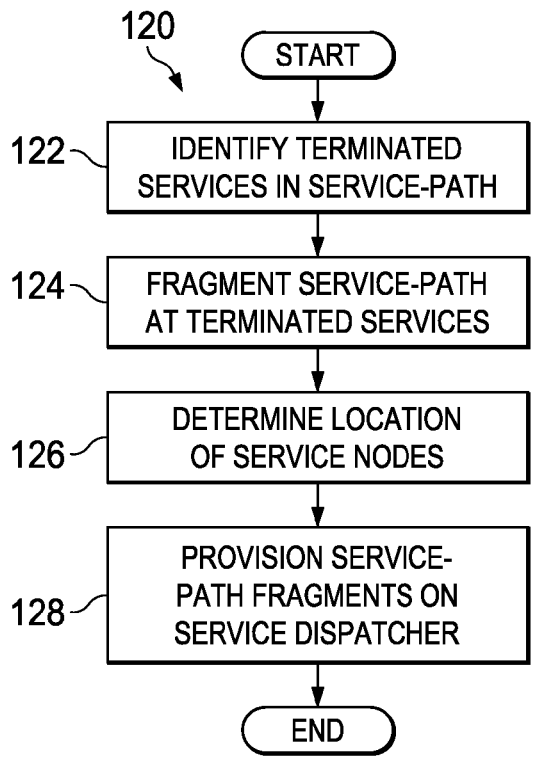
FIG. 10 is a simplified flow diagram illustrating other example operations that may be associated with an embodiment of the communication system.

Turning to FIG. 10, FIG. 10 is a simplified flow diagram illustrating example operations 120 that may be associated with an embodiment of communication system 10. At 122, SC 14 may identify one or more terminated services in a configured service path. At 124, SC 14 may fragment the configured service-path at the terminated services. At 126, SC 14 may determine the location of the service nodes providing the services (including the terminated services). At 128, SC 14 may suitably provision the service-path fragments on SD 16.

Figure 11:
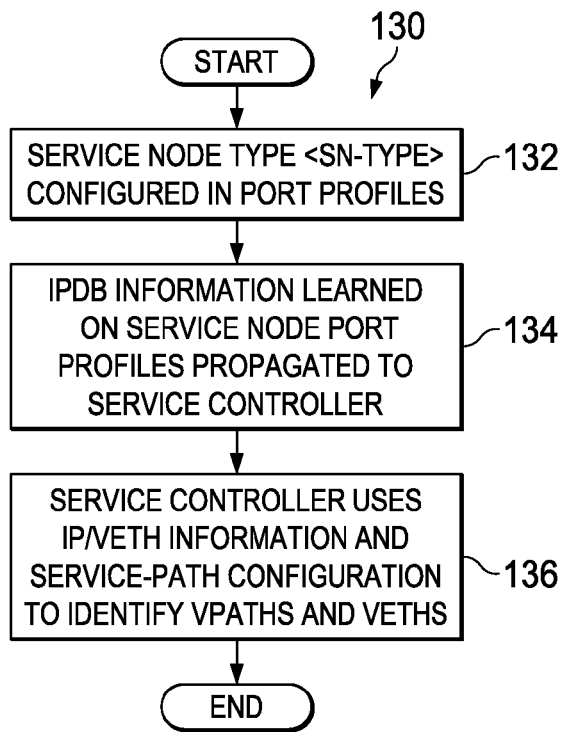
FIG. 11 is a simplified flow diagram illustrating yet other example operations that may be associated with an embodiment of the communication system.

Turning to FIG. 11, FIG. 11 is a simplified flow diagram illustrating example operations 130 that may be associated with an embodiment of communication system 10. At 132, a service node type (e.g., <SN-TYPE>) may be configured in port profile 50 of respective service node 18. At 134, Internet Protocol Database (IPDB) information (including the IP address of service nodes within the network) may be learnt on service node port profile 50 and propagated to SC 14 (for example, by SD 16). At 136, SC 14 may use IP/VETH information and service-path configuration to identify vPaths (e.g., DP 24) and interfaces (e.g., vETH) at which appropriate services are provided.

Figure 12:
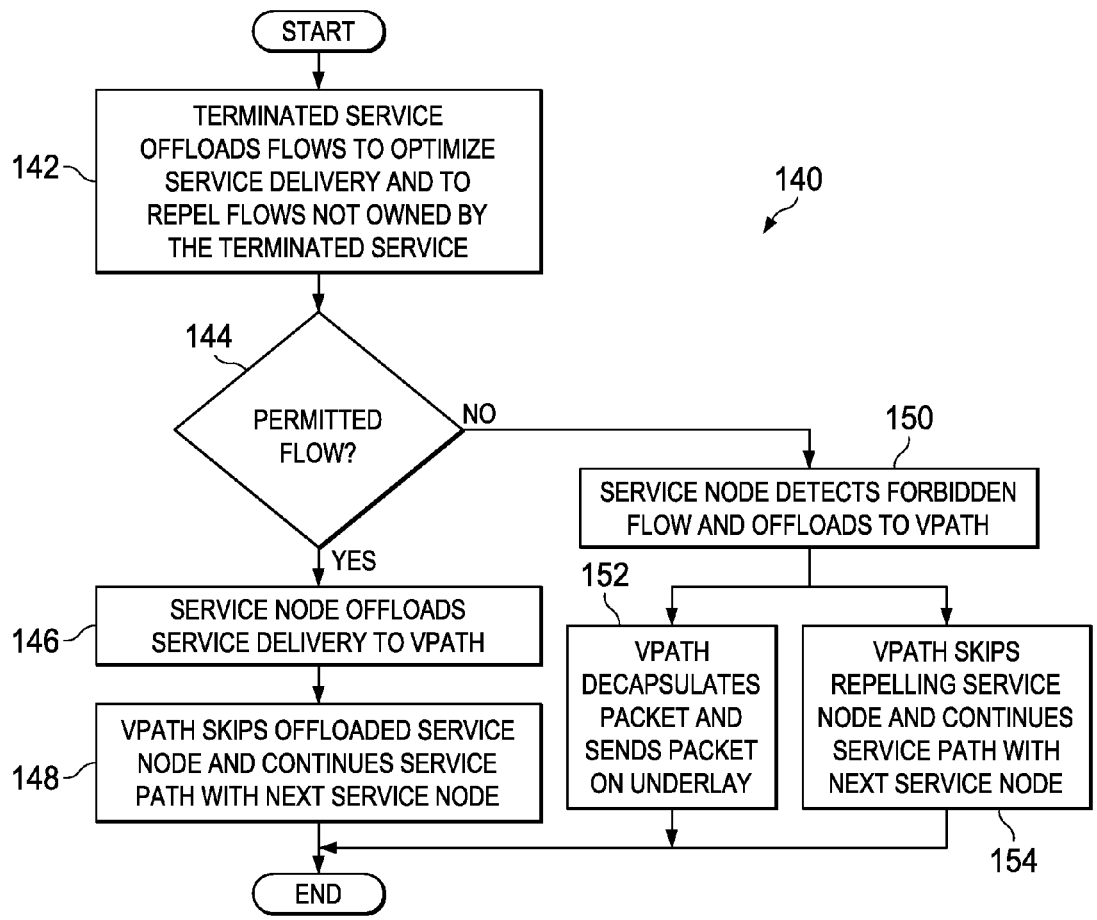
FIG. 12 is a simplified flow diagram illustrating yet other example operations that may be associated with an embodiment of the communication system.

Turning to FIG. 12, FIG. 12 is a simplified flow diagram illustrating example operations 140 that may be associated with en embodiment of communication system 10. At 142, a terminated service may offload flows to optimize service delivery and to repel flows not owned by the terminated service. At 144, a determination may be made by the terminated service whether the flow is a permitted flow. If the flow is permitted, at 146, service node 18 providing the terminated service may offload service delivery to vPath 44. At 148, vPath 44 may skip offloaded service node 18 and continue on the service-path with the next service node on the service-path.

On the other hand, if the flow is not permitted as determined at 144, service node 18 may detect the forbidden flow and offload the flow to vPath 44. At 152, vPath 44 may decapsulate the packet, and send the packet on an underlay. Alternatively, at 154, vPath 44 may skip the repelling service node 18 and continue on the service path with the next service node on the service path. In some embodiments, the choice whether to send the packet on the underlay, or to repel service node 18 may be based on the traffic destination and offload directives from service node 18.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, exporter 16 and collector 18. In some embodiments, one or more of these features may be implemented in hardware, provided external to these elements, or consolidated in any appropriate manner to achieve the intended functionality. The various network elements (e.g., adaptor 14, exporter 16, collector 18) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, exporter 16, and collector 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 56, 58, NetFlow cache 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 16, control processor 36) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    partitioning a service-path into fragments at a service controller, wherein the service-path comprises an ordered sequence of services to be provided to a packet associated with a workload in a network;
    determining a location of service nodes providing the services;
    provisioning the fragments at interfaces corresponding to the service nodes in a distributed virtual switch; and
    building a service-path table and a service table, wherein the service-path table indicates services included in a corresponding fragment, and the service table indicates interfaces corresponding to the service nodes associated with a particular fragment.

2. The method of claim 1, wherein at least some of the service nodes are associated with a port profile comprising service node type information, wherein a location of a particular one of the service nodes is determined from service node type information.

3. The method of claim 1, wherein at least one fragment comprises at least one terminated service.

4. The method of claim 1, further comprising:
    generating a plurality of service insertion points corresponding to the fragments at a service dispatcher, wherein the service dispatcher includes a plurality of data plane components.

5. The method of claim 4, wherein the service-path is partitioned into a first fragment and a second fragment, wherein the first fragment includes services to be provided at a first service insertion point corresponding to the workload, wherein the second fragment includes services to be provided at a second service insertion point corresponding to a terminated service, wherein the first service insertion point is different from the second service insertion point.

6. The method of claim 5, wherein the packet belongs to traffic that is local to the workload, and wherein particular services corresponding to the first fragment are provided for the packet.

7. The method of claim 5, wherein the packet belongs to traffic that is not local to the workload, and wherein services corresponding to the first fragment and the second fragment are provided for the packet.

8. The method of claim 4, further comprising:
    receiving the packet at one of the service insertion points;
    determining services to be provided to the packet using the service-path table;
    determining an interface through which the packet is to be forwarded to obtain the services at the service insertion point; and
    forwarding the packet according to the sequence of the services.

9. The method of claim 8, wherein the determining the services comprises examining an overlay header of the packet, wherein the overlay header includes an identification of the service-path and a progress of the packet through the service-path.

10. The method of claim 1, further comprising:
    generating a forward service-path and a reverse service-path, wherein the forward service-path corresponds to forward traffic from the workload, and the reverse service-path corresponds to reverse traffic to the workload, wherein the forward service-path and the reverse service-path are partitioned into separate pluralities of fragments.

11. One or more non-transitory tangible computer readable media that includes instructions for execution, which when executed by a processor, is operable to perform operations comprising:
    partitioning a service-path into fragments at a service controller, wherein the service-path comprises an ordered sequence of services to be provided to a packet associated with a workload in a network;
    determining a location of service nodes providing the services;
    provisioning the fragments at interfaces corresponding to the service nodes in a distributed virtual switch; and
    building a service-path table and a service table, wherein the service-path table indicates services included in a corresponding fragment, and the service table indicates interfaces corresponding to the service nodes associated with a particular fragment.

12. The media of claim 11, wherein at least some of the service nodes are associated with a port profile comprising service node type information, wherein a location of a particular one of the service nodes is determined from service node type information.

13. The media of claim 11, wherein at least one fragment comprises at least one terminated service.

14. The media of claim 11, wherein the operations further comprise:
   generating a plurality of service insertion points corresponding to the fragments at a service dispatcher, wherein the service dispatcher includes a plurality of data plane components.

15. The media of claim 11, wherein the operations further comprise generating a forward service-path and a reverse service-path, wherein the forward service-path corresponds to forward traffic from the workload, and the reverse service-path corresponds to reverse traffic to the workload.

16. An apparatus, comprising:
   a service controller in a distributed virtual switch network environment, wherein the service controller includes a memory element for storing data, and a processor, wherein the processor executes instructions associated with the data, wherein the processor and the memory element cooperate, such that the apparatus is configured for:
      partitioning a service-path into fragments at a service controller, wherein the service-path comprises an ordered sequence of services to be provided to a packet associated with a workload in a network;
      determining a location of service nodes providing the services;
      provisioning the fragments at interfaces corresponding to the service nodes in a distributed virtual switch; and
      building a service-path table and a service table, wherein the service-path table indicates services included in a corresponding fragment, and the service table indicates interfaces corresponding to the service nodes associated with a particular fragment.

17. The apparatus of claim 16, wherein at least some of the service nodes are associated with a port profile comprising service node type information, wherein a location of a particular one of the service nodes is determined from service node type information.

18. The apparatus of claim 16, wherein at least one fragment comprises at least one terminated service.

19. The apparatus of claim 16, further comprising a service dispatcher including a plurality of data plane components, wherein the apparatus is further configured for:
   generating a plurality of service insertion points corresponding to the fragments at the service dispatcher, wherein the service dispatcher includes a plurality of data plane components.

20. The apparatus of claim 16, further configured for generating a forward service-path and a reverse service-path, wherein the forward service-path corresponds to forward traffic from the workload, and the reverse service-path corresponds to reverse traffic to the workload.

* * * * *